United States Patent
Shin et al.

(10) Patent No.: US 8,040,946 B2
(45) Date of Patent: Oct. 18, 2011

(54) AUDIO/VIDEO DATA SYNCHRONIZATION APPARATUS FOR TRANSMITTING UNCOMPRESSED AUDIO/VIDEO DATA

(75) Inventors: Young-Shik Shin, Suwon-si (KR); Kang-Hoon Lee, Yongin-si (KR); Dae-Hyun Sim, Seoul (KR); In-Kwon Kang, Seoul (KR); Hyun-Soo Kim, Suwon-si (KR); Kwan-Sic Kim, Yongin-si (KR); Jin-Choul Lee, Suwon-si (KR); Dong-Jun Lee, Suwon-si (KR); Sang-Chan Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1145 days.

(21) Appl. No.: 11/771,637

(22) Filed: Jun. 29, 2007

(65) Prior Publication Data

US 2008/0123789 A1 May 29, 2008

(30) Foreign Application Priority Data

Jun. 30, 2006 (KR) .................. 10-2006-0061107

(51) Int. Cl.
*H04N 11/02* (2006.01)
(52) U.S. Cl. ............ 375/240.01; 375/240.18; 375/240.2
(58) Field of Classification Search ............ 375/240.01, 375/240.018, 240.02
See application file for complete search history.

(56) References Cited

FOREIGN PATENT DOCUMENTS

| | | |
|---|---|---|
| JP | 2006086554 | 3/2006 |
| KR | 1020050066990 | 6/2005 |
| KR | 1020050088700 | 9/2005 |
| WO | WO2005101694 | 10/2005 |

OTHER PUBLICATIONS

RSA/Shift Secured IFFT/FFT Based OFDM Wireless System; Rajaveerappa, D.; Almarimi, A.; Information Assurance and Security, 2009. IAS '09. Fifth International Conference on vol. 2 Publication Year: 2009 , pp. 208-211.*
Fast algorithm for the 3-D discrete Hartley transform; Boussakta, S.; Alshibami, O.; Acoustics, Speech, and Signal Processing, 2000. ICASSP '00. Proceedings. 2000 IEEE International Conference on vol. 6; Publication Year: 2000 , pp. 2302-2305 vol. 4.*
Real time frequency domain processing of medical images; Fox, M.D.; Bioengineering Conference, 1988., Proceedings of the 1988 Fourteenth Annual Northeast; Publication Year: 1988 , pp. 285-286.*

* cited by examiner

*Primary Examiner* — David Y Jung
(74) *Attorney, Agent, or Firm* — The Farrell Law Firm, P.C.

(57) ABSTRACT

Disclosed is an audio/video data synchronization apparatus for directly transmitting decoded audio/video data to an external device, without compressing the data, using UWB communication. The apparatus synchronizes video and audio data stored in a terminal without compressing the data and simultaneously transmits the data to an external device using UWB communication, so that users can enjoy high-quality images and sounds. In addition, the receiving end does not necessarily incorporate a separate function for decoding moving images, because it receives uncompressed video/audio data. This makes the apparatus simple and convenient.

6 Claims, 3 Drawing Sheets

AUDIO/VIDEO DATA SYNCHRONIZATION APPARATUS FOR TRANSMITTING UNCOMPRESSED AUDIO/VIDEO DATA

PRIORITY

This application claims priority to an application entitled "Audio/Video Data Synchronization Apparatus for Transmitting Uncompressed Audio/Video Data" filed with the Korean Intellectual Property Office on Jun. 30, 2006 and assigned Serial No. 2006-0061107, the contents of which are incorporated herein by reference.

BACKGROUND OF THE INVENTION

1. Field of the Invention

The present invention relates generally to an audio/video data synchronization apparatus for transmitting uncompressed audio/video data, and more particularly, to an audio/video data synchronization apparatus for directly transmitting decoded audio/video data to an external device, without compressing the data, by using Ultra-Wide Band (UWB) communication.

2. Description of the Related Art

In general, when a terminal transmits moving image data including large-capacity video data and audio data, the data is compressed before transmission by using moving image compression technology (e.g. MPEG or H.264). When a device receives the data, it decompresses the moving image data so that the video and audio data is output via a screen and a speaker, respectively. However, the receiving end of the device must incorporate a separate decoding function for decoding the compressed moving images. Furthermore, the video and audio qualities are usually worse than in the case of direct transmission of uncompressed video/audio data. Therefore, technology for directly transmitting audio/video data without compressing it when a terminal needs to transmit decoded audio/video data to an external device is needed.

In order to transmit large-capacity video/audio data wirelessly without compressing it, as mentioned above, wireless technology having a large transmission capacity is necessary, and UWB communication technology is drawing attention in this regard. The UWB communication technology refers to communication technology using a wide frequency band in a broad sense, and has mainly been under research for military purposes in the United States since the 1950s.

After declassification in 1994, several venture companies and laboratories started to develop the UWB wireless technology for commercial purposes. On Feb. 14, 2002, the U.S. Federal Communications Commission (the FCC) permitted commercial use of UWB wireless technology. Currently, IEEE (Institute of Electrical and Electronics Engineers) 802.15 WG (Working Group) is conducting standardization of the UWB technology. The FCC defines UWB as a type of wireless transmission technology using a frequency bandwidth of at least 20% with regard to the center frequency, or a bandwidth of 500 MHz or higher. The bandwidth is determined with regard to −10 dB threshold, not −3 dB threshold as in other types of communication. Unlike conventional narrowband communication for transmitting data by loading baseband signals onto carrier waves, UWB uses very short baseband pulses (i.e. nanosecond grade) so as to transmit data without using carrier waves. Particularly, UWB pulses correspond to several nanoseconds in the time-axis domain, and have a broad bandwidth (GHz grade) on the frequency spectrum. Therefore, it can be said that the UWB technology has a substantially broad frequency bandwidth compared with conventional narrowband wireless communication technologies. The UWB wireless technology, which uses very short pulses for data transmission, has several features distinguishing it from conventional narrowband communication. The UWB basically uses pulses for signal transmission and has a very broad bandwidth in the frequency domain, but a small transmission power density on the frequency axis. This means that communication is possible even below a noise band. Application fields of UWB communication include OFDM (Orthogonal Frequency Division Multiplexing). The OFDM transmission technology uses a number of multi-carriers so as to enable high-speed data transmission.

In general, when a terminal decodes moving image data for display, the data is divided into video and audio data, which are output via respective paths. Therefore, in order to directly transmit decoded video/audio data without compressing it, it is necessary not only to use a high data transmission rate, but also to synchronize the video and audio data, which are output via respective paths, according to the moving image playing time before transmission.

SUMMARY OF THE INVENTION

Accordingly, the present invention has been made to solve the above-mentioned problems occurring in the prior art, and an aspect of the present invention is to provide an apparatus for transmitting audio/video data, which is output after decoding, to an external device by using UWB communication without compressing the data.

Another aspect of the present invention is to provide an audio/video data synchronization apparatus for transmitting uncompressed audio/video data to an external device according to moving image playing time.

In order to accomplish these aspects of the present invention, there is provided an audio/video data synchronization apparatus for transmitting decoded audio/video data to an external device without compressing the data, the apparatus including a video buffer for storing decoded video data and outputting corresponding video data bits based on a control signal; an audio buffer for storing decoded audio data and outputting corresponding audio data bits based on a control signal; a mapper for converting input data bits into symbols having information of a predetermined size and successively allocating respective symbols to sub-carriers of Inverse Fast Fourier Transforms (IFFTs); at least one IFFT for subjecting input symbols to inverse fast Fourier transformation; and a buffer controller for obtaining a data amount per second ratio between the video data and audio data, the buffer controller calculating a data amount per second ratio multiplied by an integer so that there are a smallest number of null sub-carriers, no data being allocated to the null sub-carriers when symbols of video and audio data bits to be transmitted are allocated to the sub-carriers of the IFFTs, the buffer controller controlling the video and audio buffers so as to output the video and audio data bits to the mapper according to the calculated data amount per second ratio multiplied by an integer.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
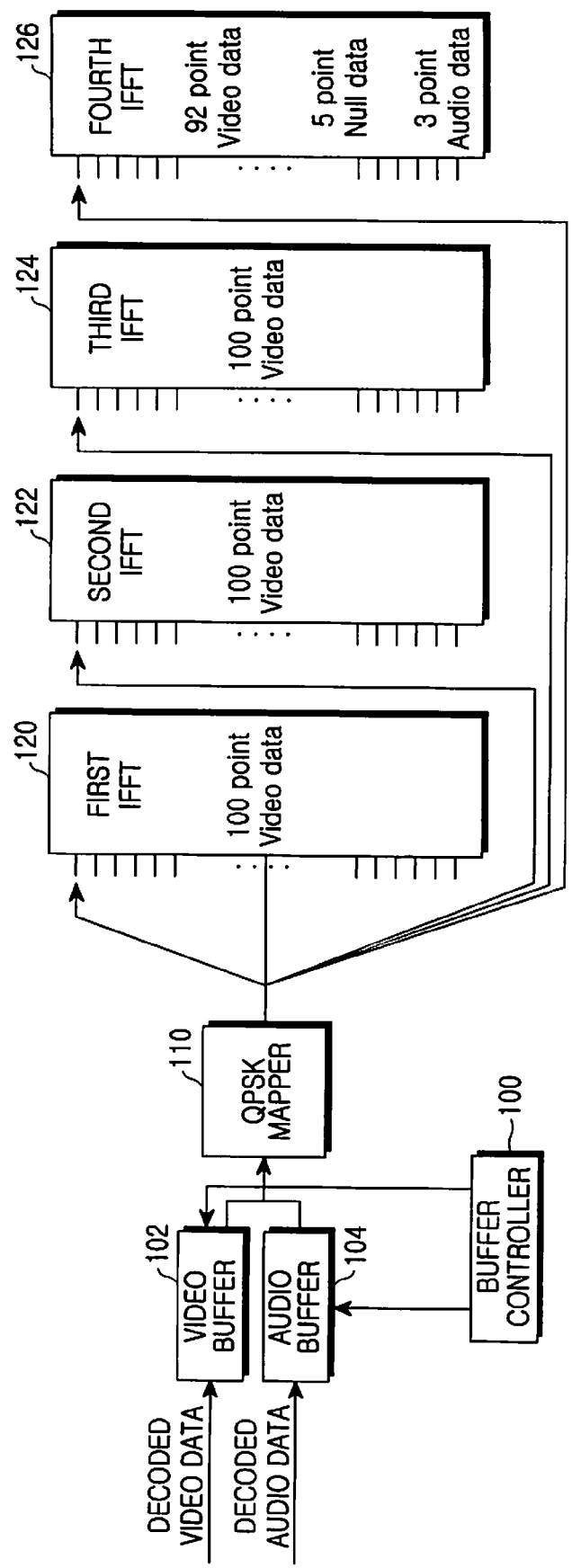
FIG. 1 shows an apparatus for allocating decoded audio/video data to sub-carriers of OFDM IFFTs according to an embodiment of the present invention.

Hereinafter, preferred embodiments of the present invention will be described with reference to the accompanying drawings. In the following description of the present invention, a detailed description of known functions and configurations incorporated herein is omitted to avoid making the subject matter of the present invention unclear.

A method for creating a data frame by synchronizing video/audio data according to moving image playing time and allocating the data to multi-carriers of OFDM IFFTs (Inverse Fast Fourier Transforms) so that video and audio data, which have been decoded by a terminal, can be simultaneously transmitted to an external device according to the present invention will now be described with reference to the accompanying drawings.

The internal construction of an apparatus for allocating decoded audio/video data to sub-carriers of OFDM IFFTs according to an embodiment of the present invention will now be described with reference to FIG. 1. In order to create UWB frame data, 128-point IFFT blocks are used, and data is actually allocated to 100 points of each IFFT. In this case, IFFTs may be replaced with Fast Fourier transforms (FFTs).

It is assumed that a buffer controller 100 is requested to transmit decoded video/audio data to an external device without encoding the data. The buffer controller 100 controls a video buffer 102, which temporarily stores decoded video data, and an audio buffer 104, which temporarily stores decoded audio data, so that video and audio data bits are output to a QPSK (Quadrature Phase Shift Keying) mapper 110 according to a synchronization ratio. As used herein, the synchronization ratio refers to a ratio at which video and audio data bits are transmitted to the QPSK mapper 110 in such a manner that decoded audio/video data is synchronized according to the moving image playing time. Under the control of the buffer controller 100, the video and audio buffers 102 and 104 output video and audio data bits alternately at a ratio for synchronization between them, as in the case of a payload 200 shown in FIG. 3. Particularly, a data set labeled 200-1 is repeatedly output. In this regard, null data corresponds to the number of data bits related to sub-carriers, which have no data allocated thereto even after all video and audio data bits are allocated to sub-carriers of IFFTs according to the OFDM transmission scheme. The present invention aims at providing a method for minimizing the number of sub-carriers, which have no data allocated to their IFFTs when data is allocated at a ratio for synchronizing video and audio data.

Figure 3:
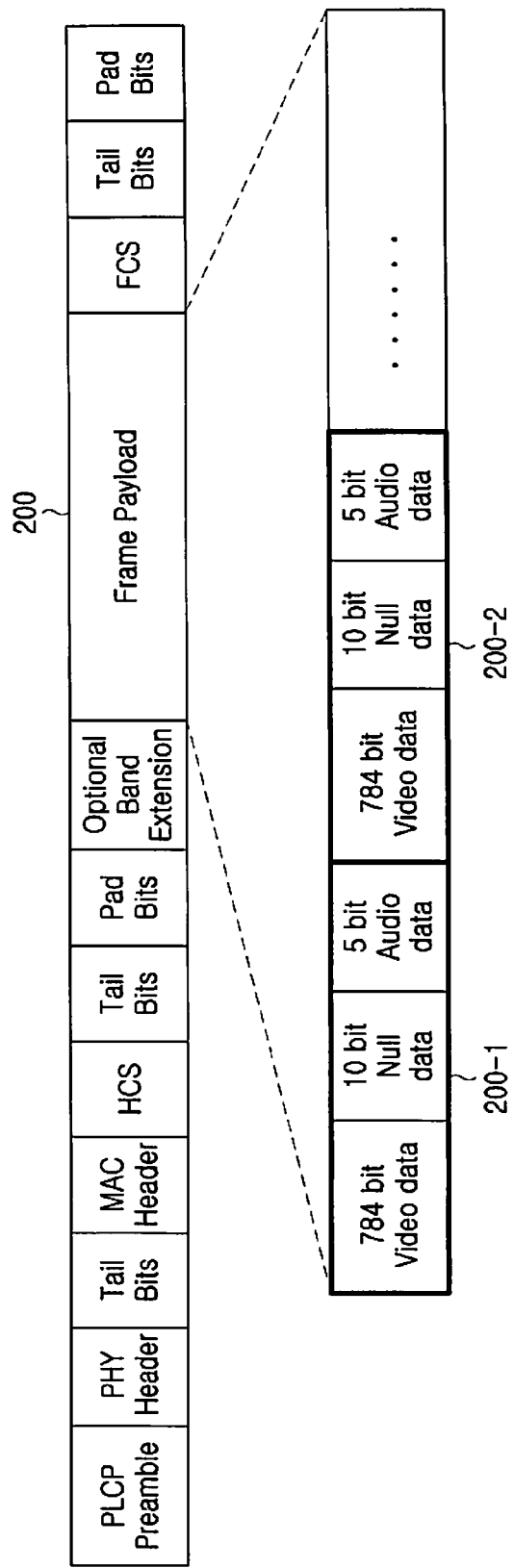
FIG. 3 shows a UWB frame format, after allocation of audio/video data bits, according to an embodiment of the present invention.

As such, the video and audio buffers 102 and 104 output video and audio data bits, which constitute a frame payload 200 at a predetermined ratio as shown in FIG. 3, to the QPSK mapper 110 according to buffer control signals. Then, the QPSK mapper 110 converts received data bits into QPSK symbols having 2-bit information, and successively allocates respective symbols to sub-carriers of IFFTs 120, 122, 124, and 126.

An example of a process for creating the frame payload shown in FIG. 3, which consists of video and audio data bits at the above-mentioned video/audio data ratio for synchronization, will now be described with reference to Tables 1 and 2. In the case of a UWB frame format shown in FIG. 2, the frame payload alone corresponds to data bits input to the QPSK mapper 110 from the video and audio buffers 102 and 104 under the control of the buffer controller 100, respectively, and remaining portions correspond to data bits input directly, i.e. under no control of the buffer controller 100, so as to constitute the UWB frame format.

TABLE 1

| Video | No. of bits per pixel | No. of moving image frames | Resolution | Amount of data per second |
|---|---|---|---|---|
| VGA | 24 | 30 | 640 * 480 | 640 * 480 * 24 * 30 = 221.184 Mbps |
| QVGA | 24 | 30 | 320 * 240 | 320 * 480 * 24 * 30 = 55.296 Mbps |

| Audio | No. of quantization bits per channel | No. of channels | Sampling frequency | Amount of data per second |
|---|---|---|---|---|
| Hifi-Stereo | 16 | 2 | 44.1 Mhz | 16 * 2 * 44100 = 1.4112 Mbps |

Table 1 specifies the total amount of video and audio data allocated to the frame payload shown in FIG. 3. It is assumed in the description of the present embodiment that the terminal transmits a VGA 30 frame as the video data to an external device. It is clear from Table 1 that the amount of video data per second is calculated from the number of bits per pixel, the number of moving image frames, and the resolution; and the amount of audio data per second is calculated from the number of quantization bits per channel, the number of channels, and the sampling frequency. The ratio between the amount of video data per second and the amount of audio data per second, when a VGA 30 frame is transmitted, is calculated as defined by Equation (1) below.

$$\text{Amount of video data per second/amount of audio data per second} = 221.184 \text{ Mbit}/1.4112 \text{ Mbit}$$

$$= 156.73 \text{ Mbit} \quad (1)$$

It is clear from Equation (1) that one bit of audio data must be synchronized per 157 bits of video data. In this regard, when video and audio data are synchronized so as to allocate data bits of the frame payload, it is necessary to minimize the number of sub-carriers which have no data allocated to their IFFTs.

It will then be described with reference to Table 2 how many video and audio data bits must be synchronized so as to minimize sub-carriers having no data allocated to their IFFTs.

TABLE 2

| No. of video data bits | No. of necessary IFFT sub-carriers | No. of audio data bits | No. of necessary IFFT sub-carriers | No. of IFFT sub-carriers necessary for allocation of video/audio bits | Count of IFFTs | No. of null sub-carriers |
|---|---|---|---|---|---|---|
| 156.73 | 79 | 1 | 1 | 79 + 1 = 80 | 1 | 100 − 80 = 20 |
| 313.47 | 157 | 2 | 1 | 157 + 1 = 158 | 2 | 200 − 158 = 42 |
| 470.2 | 236 | 3 | 2 | 236 + 2 = 238 | 3 | 300 − 236 = 64 |

TABLE 2-continued

| No. of video data bits | No. of necessary IFFT sub-carriers | No. of audio data bits | No. of necessary IFFT sub-carriers | No. of IFFT sub-carriers necessary for allocation of video/audio bits | Count of IFFTs | No. of null sub-carriers |
|---|---|---|---|---|---|---|
| 626.94 | 314 | 4 | 2 | 314 + 2 = 316 | 4 | 400 − 314 = 86 |
| 783.67 | 392 | 5 | 3 | 392 + 3 = 395 | 4 | 400 − 395 = 5 |

When 157 audio data bits are synchronized with one audio data bit as defined by Equation (1), the number of IFFT sub-carriers necessary for the 157 video data bits is 79, and the number of IFFT sub-carriers necessary for one audio data bit is 1. Therefore, the total number of IFFT sub-carriers necessary to allocate video/audio data bits is 80 and, in this case, one IFFT capable of using 100 points is necessary. Among the 100 points, 80 points are used, and 20 points remain. This means that there are 20 null sub-carriers, i.e. 20 carriers which have no allocation. In this regard, a ratio of synchronization based on the ratio of amount of video/audio data per second will hereinafter referred to as a video/audio data synchronization ratio. The video/audio data synchronization ratio is multiplied by an integer so as to find a ratio at which data bits are allocated to IFFTs while minimizing the number of sub-carriers having null data allocated thereto.

It will be assumed that 314 video data bits are synchronized with 2 audio data bits, i.e. that video data bits are synchronized with audio data bits at a double video/audio data synchronization ratio. The number of IFFT sub-carriers necessary for the 314 video data bits is 157, and the number of IFFT sub-carriers necessary for the 2 audio data bits is 1. Therefore, the total number of IFFT sub-carries necessary to allocate video/audio data bits is 158 and, in this case, 2 IFFTs are necessary. After 158 points are used from 200 available points of the two IFFTs, 42 points remain. This means that the number of null sub-carriers is 42.

The same calculation is made assuming that 470 video data bits are synchronized with 3 audio data bits, that 627 video data bits are synchronized with 4 audio data bits, and that 784 video data bits are synchronized with 5 audio data bits, respectively. The result of calculation is given in Table 2 and shows that it is when 784 video data bits are respectively synchronized with 5 audio data bits that data bits are allocated to IFFTs with the smallest number of sub-carriers having null data allocated thereto. There are 5 null sub-carriers in this case, which means that 10 pieces of null data occur.

Therefore, the buffer controller 100 transmits control signals to the video and audio buffers 102 and 104, respectively, so that they output 784 video data bits, 10 null data bits, and 5 audio data bits to the QPSK mapper 110 at five times the video/audio data synchronization ratio, as indicated by reference numeral 200-1 in FIG. 3.

Thereafter, the buffer controller 100 transmits control signals to the video and audio buffers 102 and 104, respectively, so that they output 784 video data bits, 10 null data bits, and 5 audio data bits to the QPSK mapper 110, as indicated by reference numeral 200-2 in FIG. 3. As such, the buffer controller 100 repeatedly transmits control signals to the video and audio buffers 102 and 104, respectively, so that they output 784 video data bits, 10 null data bits, and 5 audio data bits to the QPSK mapper 110 until the data transmission is over, as indicated by reference numerals 200-1 and 200-2.

Then, the QPSK mapper 110 allocates every two of the input data bits to respective points of the first to fourth IFFTs 120, 122, 124, and 126 in this order. The resulting symbols, which consist of two input bits, are then subjected to inverse fast Fourier transformation by respective IFFTs.

Figure 2:
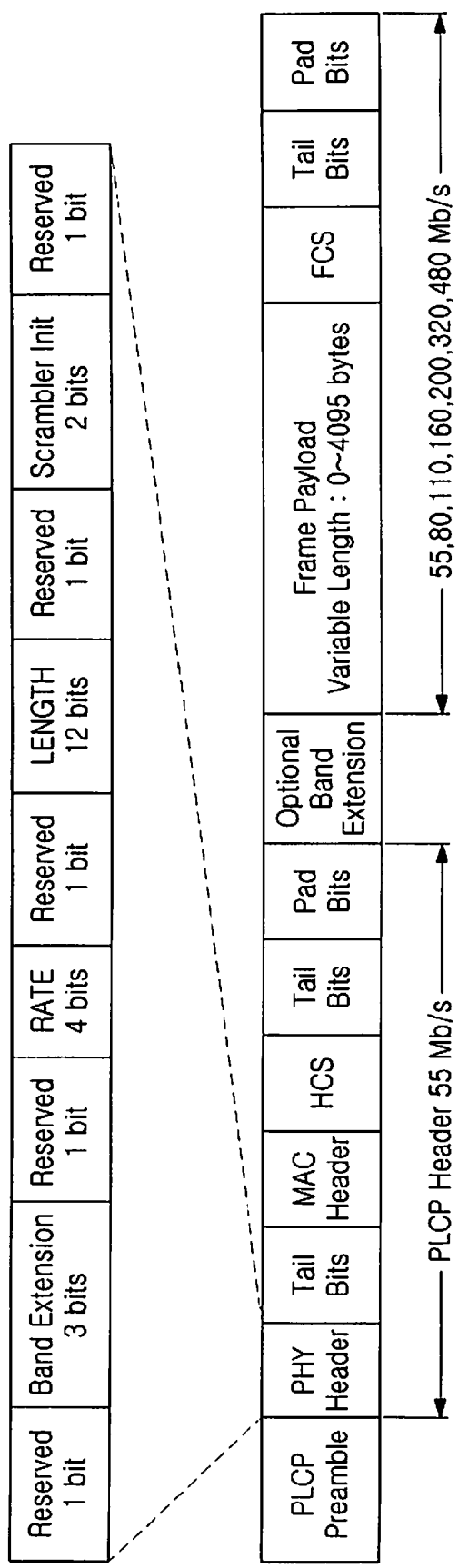
FIG. 2 shows a UWB frame format according to a conventional OFDM transmission scheme.

The ratio between the amount of video data per second and that of audio data per second obtained from Equation (1) is based on an assumption that the video data has a resolution of 640*480 as in the case of FIGS. 1 and 2. It has been found in that case that, when 784 video data bits, 10 null data bits, and 5 audio data bits are successively output to the QPSK mapper 110, synchronization is possible with the smallest number of sub-carriers of IFFTs having null data allocated thereto.

However, when video data having a different resolution needs to be transmitted, the ratio of video/audio data per second varies depending on the resolution and the number of frames per second of the video data. In that case, the same calculation is made as described with reference to Table 2, based on the varied ratio of video/audio data, so as to obtain the number of video data bits, the number of audio data bits, and the number of null data bits, which enable synchronization with the smallest number of sub-carriers of IFFTs having null data allocated thereto. The obtained numbers guarantee efficient allocation of data bits to sub-carriers of OFDM IFFTs.

It is also possible to presume a number of cases based on factors (e.g. the resolution of video data) affecting the amount of video data to be transmitted per second and that of audio data to be transmitted per second. For each case, the same calculation is made as described with reference to Table 2 so as to obtain the number of video data bits, the number of audio data bits, the number of null data bits, and the number of necessary IFFTs, which are necessary for synchronization with the smallest number of sub-carriers of IFFTs. The obtained numbers are tabulated and stored in the terminal. This approach makes it possible to refer to the table and select numbers suitable for the conditions of video/audio data to be transmitted, without calculating numbers for each case, so that a frame payload can be created easily.

As mentioned above, the present invention is advantageous in that, since video and audio data stored in a terminal are synchronized and simultaneously transmitted to an external device using UWB communication without compressing the data, users can enjoy high-quality images and sounds. In addition, the receiving end does not necessarily incorporate a separate function for decoding moving images, because it receives uncompressed video/audio data. This makes the apparatus simple and convenient.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An audio/video data synchronization apparatus for transmitting decoded audio/video data to an external device without compressing the data, the apparatus comprising:
   a video buffer for storing decoded video data and outputting corresponding video data bits based on a control signal;
   an audio buffer for storing decoded audio data and outputting corresponding audio data bits based on a control signal;
   a mapper for converting input data bits into symbols having information of a predetermined size and successively allocating respective symbols to sub-carriers of Inverse Fast Fourier Transforms (IFFTs);
   at least one IFFT for subjecting input symbols to inverse fast Fourier transformation; and
   a buffer controller for obtaining a data amount per second ratio between the video data and audio data, the buffer controller calculating a data amount per second ratio multiplied by an integer so that there are a smallest number of null sub-carriers, no data being allocated to the null sub-carriers when symbols of video and audio data bits to be transmitted are allocated to the sub-carriers of the IFFTs, the buffer controller controlling the video and audio buffers so as to output the video and audio data bits to the mapper according to the calculated data amount per second ratio multiplied by an integer.

2. The apparatus as claimed in claim 1, wherein the buffer controller calculates a necessary IFFT sub-carrier number, a necessary IFFT number, and a sub-carrier number based on the IFFT number according to a video/audio data amount per second ratio multiplied by an integer, the buffer controller subtracts the necessary IFFT sub-carrier number from the calculated sub-carrier number to obtain a null sub-carrier number, the buffer controller selects a video/audio data amount per second ratio multiplied by an integer having a smallest null sub-carrier number from a number of video/audio data amount per second ratios multiplied by an integer, and the buffer controller controls the video and audio buffers so as to output video and audio data bits to the mapper according to the selected video/audio data amount per second ratio multiplied by an integer.

3. The apparatus as claimed in claim 2, wherein, when the buffer controller controls the video and audio buffers so as to output video and audio data bits to the mapper according to the selected video/audio data amount per second ratio multiplied by an integer, null data bits to be allocated to the null sub-carriers are also output to the mapper.

4. The apparatus as claimed in claim 3, wherein the buffer controller controls the video and audio buffers so as to repeatedly output video data bits, audio data bits, and the null data bits to the mapper according to the video/audio data amount per second ratio multiplied by an integer until video/audio data transmission is over.

5. The apparatus as claimed in claim 4, wherein the buffer controller controls the video and audio buffers so that video data bits output from the video buffer, the null data bits, and audio data bits output from the audio buffer are successively output to the mapper.

6. The apparatus as claimed in claim 5, wherein the mapper is a QPSK mapper, and the mapper converts received data bits into QPSK symbols having 2-bit information and successively allocates respective QPSK symbols to sub-carriers of IFFTs.

* * * * *